US010870418B2

(12) United States Patent
Son et al.

(10) Patent No.: US 10,870,418 B2
(45) Date of Patent: Dec. 22, 2020

(54) ELECTRONIC BRAKE SYSTEM AND CONTROL METHOD THEREOF

(71) Applicant: MANDO CORPORATION, Gyeonggi-do (KR)

(72) Inventors: Joo-Hee Son, Gyeonggi-do (KR); Seong-Ho Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 68 days.

(21) Appl. No.: 15/897,151

(22) Filed: Feb. 14, 2018

(65) Prior Publication Data
US 2018/0229702 A1 Aug. 16, 2018

(30) Foreign Application Priority Data

Feb. 15, 2017 (KR) .................. 10-2017-0020649
Feb. 14, 2018 (KR) .................. 10-2018-0018179

(51) Int. Cl.
*B60T 8/40* (2006.01)
*B60T 7/04* (2006.01)

(52) U.S. Cl.
CPC ............ *B60T 8/4086* (2013.01); *B60T 7/042* (2013.01); *B60T 8/4081* (2013.01); *B60T 2220/04* (2013.01)

(58) Field of Classification Search
CPC ...... B60T 8/4081; B60T 8/4077; B60T 7/042; B60T 13/745; B60T 13/662; B60T 13/686
See application file for complete search history.

(56) References Cited

U.S. PATENT DOCUMENTS 4,655,511 A  4/1987 Leiber
4,720,152 A  1/1988 Adachi et al.
(Continued)

FOREIGN PATENT DOCUMENTS

CN  102596664  7/2012
CN  105691370  6/2016
(Continued)

OTHER PUBLICATIONS

Office Action dated Aug. 19, 2019 for Chinese Patent Application No. 201810153708.9 and its English machine translation by Google Translate.

*Primary Examiner* — Bradley T King
*Assistant Examiner* — Stephen M Bowes
(74) *Attorney, Agent, or Firm* — Ladas & Parry, LLP

(57) ABSTRACT

An electronic brake system includes a master cylinder connected to a reservoir, including a master chamber and a master piston provided at the master chamber, and discharging the oil according to pedal effort of a brake pedal, a sensor measuring a displacement of the brake pedal, a pedal simulator providing a reaction force according to pedal effort of the brake pedal and including a simulator chamber connected to the master cylinder, a hydraulic actuator provided between the master cylinder and a wheel cylinder and controlling a hydraulic pressure flow delivered to the wheel cylinder, a first hydraulic pressure supply device operated by an electrical signal output by corresponding to the displacement of the brake pedal, and supplying a hydraulic pressure to the hydraulic actuator, and a second hydraulic pressure supply device provided between the reservoir and the master cylinder and providing a vibration pedal feel to the brake pedal.

14 Claims, 6 Drawing Sheets

(56) References Cited

U.S. PATENT DOCUMENTS

| | | | | |
|---|---|---|---|---|
| 4,861,234 A | * | 8/1989 | Joy | B60T 8/4031 |
| | | | | 417/273 |
| 8,991,939 B2 | * | 3/2015 | Nakamura | B60T 7/042 |
| | | | | 303/9.68 |
| 2015/0061854 A1 | * | 3/2015 | Drumm | B60T 7/042 |
| | | | | 340/453 |
| 2015/0175146 A1 | * | 6/2015 | Quirant | B60T 13/662 |
| | | | | 303/14 |
| 2016/0152223 A1 | * | 6/2016 | Bauer | B60T 13/745 |
| | | | | 303/14 |
| 2016/0200307 A1 | * | 7/2016 | Feigel | B60T 8/4081 |
| | | | | 303/6.01 |

FOREIGN PATENT DOCUMENTS

| | | | | |
|---|---|---|---|---|
| DE | 3203563 | | 8/1983 | |
| DE | 19523946 A1 | * | 1/1997 | B60T 8/341 |

* cited by examiner

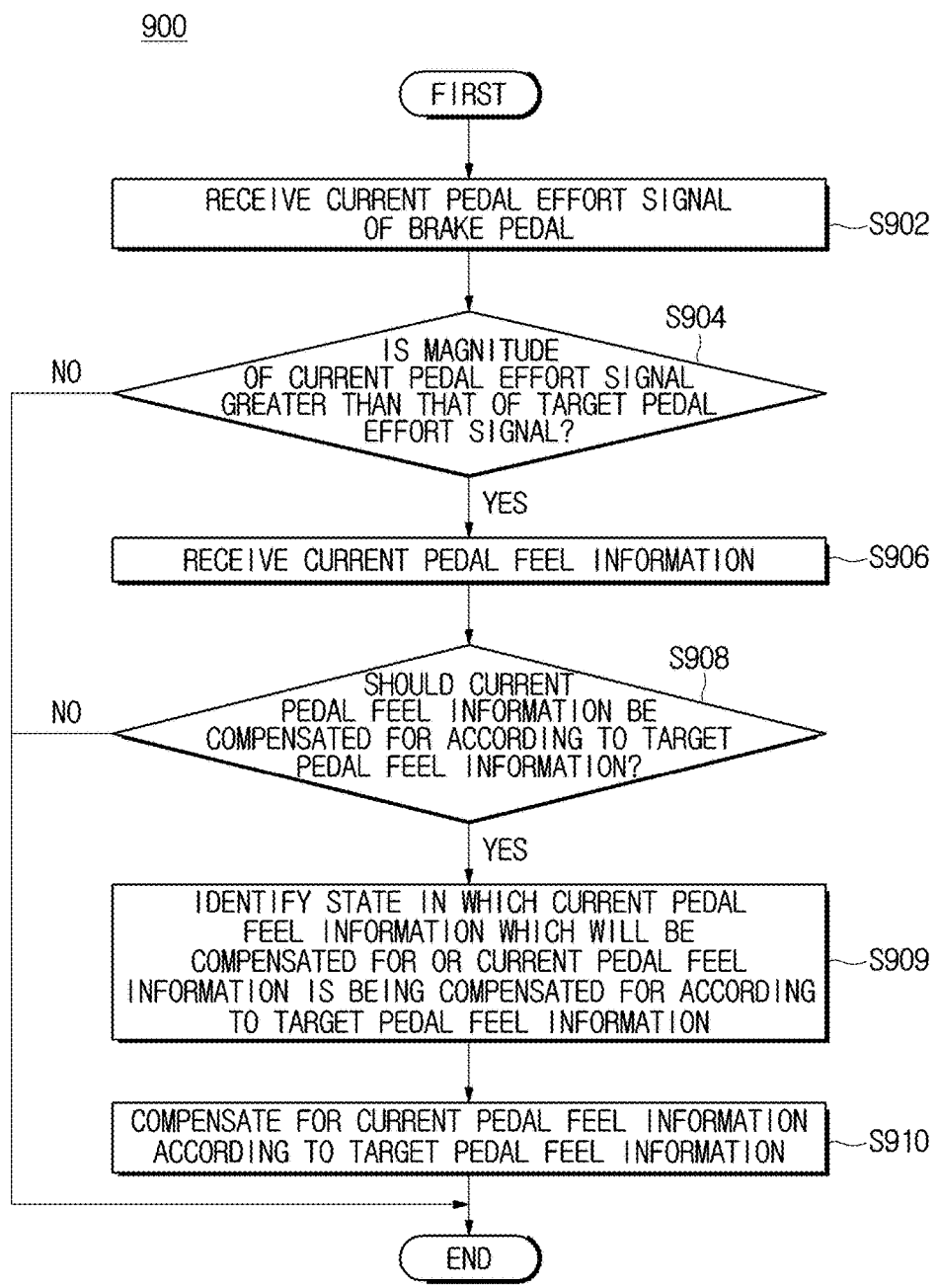

ELECTRONIC BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2017-0020649, filed on Feb. 15, 2017 and Korean Patent Application No. 10-2018-0018179, filed on Feb. 14, 2018, in the Korean Intellectual Property Office, the disclosure of which are incorporated by reference herein in its entirety.

BACKGROUND

1. Field

The present disclosure relates to an electronic brake system and a control method thereof.

2. Description of the Related Art

Generally, a conventional electronic brake system is applied to a vehicle to perform braking efficiently and stably.

A conventional electronic brake system is divided into a portion configured to generate a pedal effort for a driver and a portion configured to generate a braking force at a wheel.

However, a conventional electronic brake system has a limitation in realizing current pedal feel of a brake pedal during braking.

For example, when a conventional electronic brake system is applied to a vehicle in at least one form among an anti-lock brake system (ABS) configured to prevent wheels from slipping during braking, a brake traction control system (BTCS) configured to prevent drive wheels from slipping when a vehicle is unintentionally or intentionally accelerated, and an electronic stability control (ESC) system configured to stably maintain a traveling state of a vehicle by controlling a brake hydraulic pressure in combination with ABS and BTCS, there is a limitation in the efficient generation of a pedal feel having a vibration feel corresponding to at least one of ABS, BTCS, and ESC during braking.

SUMMARY

Therefore, it is one aspect of the present disclosure to provide an electronic brake system and a control method thereof, which are capable of realizing current pedal feel of a brake pedal when a driver steps on the brake pedal to improve reliability of a vehicle.

It is another aspect of the present disclosure to provide an electronic brake system and a control method thereof, which are capable of relieving anxiety a driver experiences during braking.

Additional aspects of the present disclosure will be set forth in part in the description which follows and, in part, will be obvious from the description, or may be learned by practice of the disclosure.

In accordance with an aspect of the present disclosure, there is provided an electronic brake system including a master cylinder connected to a reservoir storing oil, including a master chamber and a master piston provided at the master chamber, and configured to discharge the oil according to pedal effort of a brake pedal, a sensor configured to measure a displacement of the brake pedal, a pedal simulator configured to provide a reaction force according to pedal effort of the brake pedal and including a simulator chamber connected to the master cylinder to accommodate the oil, a hydraulic actuator provided between the master cylinder and a wheel cylinder and configured to control a hydraulic pressure flow delivered to the wheel cylinder, a first hydraulic pressure supply device operated by an electrical signal which is output by corresponding to the displacement of the brake pedal, and configured to supply a hydraulic pressure to the hydraulic actuator, and a second hydraulic pressure supply device provided between the reservoir and the master cylinder and configured to provide a vibration pedal feel to the brake pedal.

The master cylinder may include a first master piston directly pressurized by the brake pedal, a first master chamber configured to accommodate the first master piston, a second master piston indirectly pressurized by the first master piston, and a second master chamber configured to accommodate the second master piston, and the second hydraulic pressure supply device may be provided at a flow path connecting the second master chamber and the reservoir.

The second hydraulic pressure supply device may operate when at least one among an anti-lock brake system (ABS), a brake traction control system (BTCS), and an electronic stability control (ESC) system performs braking.

When the second hydraulic pressure supply device operates, hydraulic pressure pulsation may be delivered to the second master chamber to provide a vibration pedal feel to the brake pedal.

The second hydraulic pressure supply device may include a pump unit provided at a reservoir flow path between the reservoir and the master cylinder and an electronically controlled bidirectional valve provided at a first bypass flow path disposed in parallel with the reservoir flow path.

The second hydraulic pressure supply device may further include a check valve provided at a second bypass flow path disposed in parallel with the first bypass flow path.

The check valve may be a one-way valve configured to allow a flow from the reservoir to the master cylinder.

The pump unit may be a piston pump which moves forward and backward by an eccentric rotational shaft.

The electronically controlled bidirectional valve may be opened when the pump unit is operated.

The sensor may be provided in at least one of the brake pedal and the master cylinder.

In accordance with another aspect of the present disclosure, there is provided a control method of the above-described electronic brake system including directing a hydraulic pressure of the master cylinder to the pedal simulator when a driver pressurizes the brake pedal, and generating a pedal feel, operating the first hydraulic pressure supply device and supplying the hydraulic pressure to the hydraulic actuator in response to an electrical signal which is output by corresponding to a displacement of the brake pedal, determining whether a vibration pedal effort is required at the brake pedal, and operating the second hydraulic pressure supply device when the vibration pedal effort is required at the brake pedal.

The vibration pedal effort may be required at the brake pedal when at least one of an anti-lock brake system (ABS), a brake traction control system (BTCS), and an electronic stability control (ESC) system performs braking.

The second hydraulic pressure supply device may include a pump unit provided at a reservoir flow path between the reservoir and the master cylinder and an electronically controlled bidirectional valve provided at a first bypass flow path disposed in parallel with the reservoir flow path, and the second hydraulic pressure supply device may operate to drive the pump unit and open the electronically controlled bidirectional valve.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 6 is a flowchart illustrating a control method of an electronic brake system according to yet another embodiment of the present disclosure.

DETAILED DESCRIPTION

Figure 1:
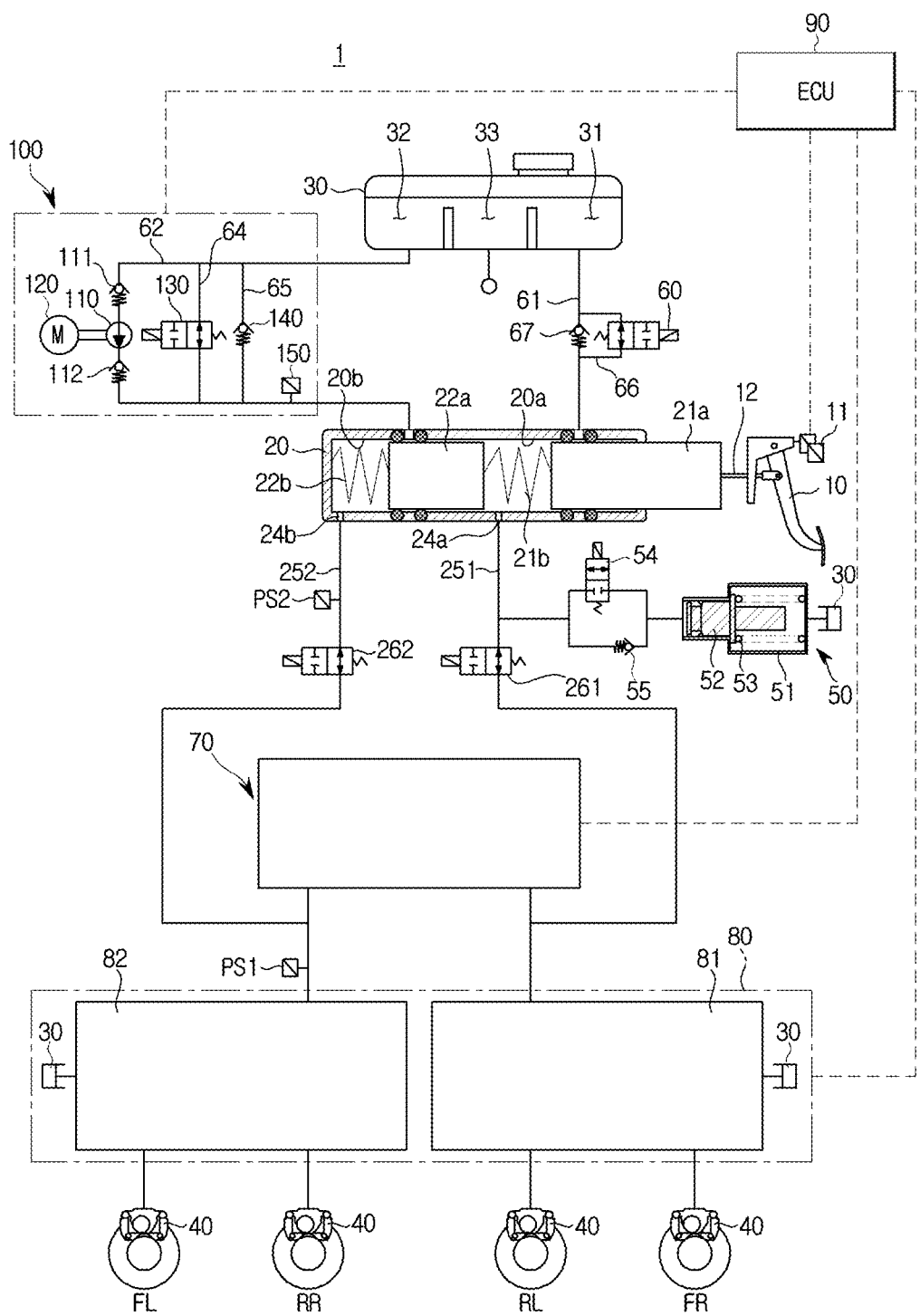
FIG. 1 is a hydraulic pressure circuit diagram illustrating a non-braking state of an electronic brake system according to one embodiment of the present disclosure.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and sizes of components may be somewhat exaggerated to facilitate understanding.

Figure 2:
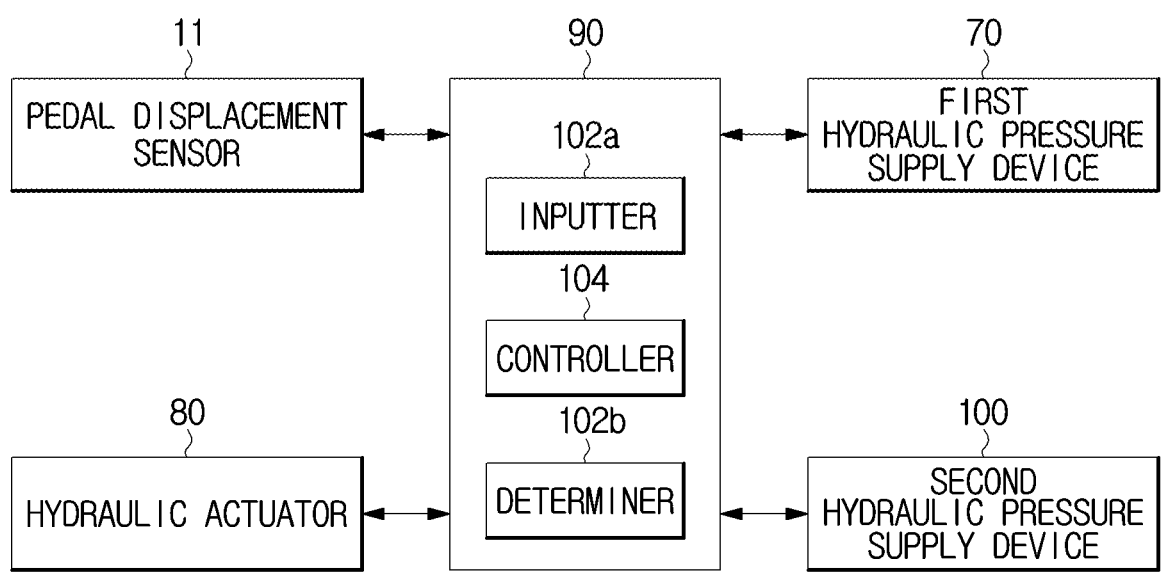
FIG. 2 is a block diagram illustrating the electronic brake system according to one embodiment of the present disclosure.
Figure 3:
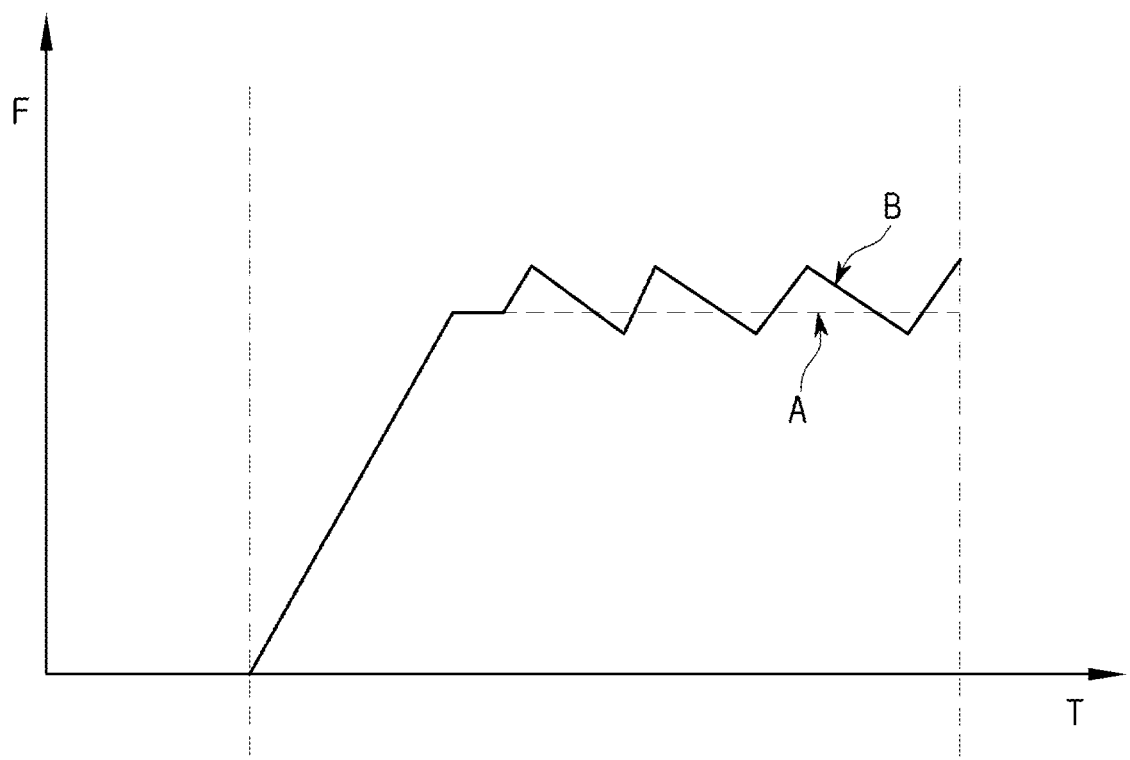
FIG. 3 is a graph illustrating feel of a brake pedal when a second hydraulic pressure supply device of the electronic brake system according to one embodiment of the present disclosure operates.

FIG. 1 is a hydraulic pressure circuit diagram illustrating a non-braking state of an electronic brake system according to one embodiment of the present disclosure, FIG. 2 is a block diagram illustrating the electronic brake system according to one embodiment of the present disclosure, and FIG. 3 is a graph illustrating feel of a brake pedal when a second hydraulic pressure supply device of the electronic brake system according to one embodiment of the present disclosure operates.

Referring to FIGS. 1 and 2, an electronic brake system 1 may include a master cylinder 20 configured to generate a hydraulic pressure, a reservoir 30 coupled to the master cylinder 20 and configured to store oil, an input rod 12 configured to pressurize the master cylinder 20 according to a pedal effort of a brake pedal 10, a wheel cylinder 40 configured to receive the hydraulic pressure and perform braking of each of wheels RR, RL, FR and FL, a pedal displacement sensor 11 configured to sense a displacement of the brake pedal 10, a pedal simulator 50 configured to provide a reaction force according to the pedal effort of the brake pedal 10, a first hydraulic pressure supply device 70 mechanically operated by receiving a braking intent of a driver from the pedal displacement sensor 11 in the form of an electrical signal, a hydraulic actuator 80 including first and second hydraulic pressure circuits 81 and 82 each provided at two wheels and configured to control a hydraulic pressure flow delivered to the wheel cylinder 40 that is provided at each of the wheels RR, RL, FR, and FL, a second hydraulic pressure supply device 100 provided between the reservoir 30 and the master cylinder 20 and configured to provide a vibration feel to the brake pedal 10, and a first electronic control unit (ECU) 90 configured to control the pedal simulator 50, the first hydraulic pressure supply device 70, the hydraulic actuator 80, the second hydraulic pressure supply device 100, and valves on the basis of hydraulic pressure information, sensed information, and pedal displacement information.

The pedal displacement sensor 11 may measure the displacement of the brake pedal 10 by directly sensing the displacement of the brake pedal 10 or by sensing a movement distance of a first piston 21a of the master cylinder 20, which will be described below.

The master cylinder 20 may be configured to include at least one chamber to generate a hydraulic pressure. For example, the master cylinder 20 may be provided with a first master chamber 20a and a second master chamber 20b.

The first piston 21a connected to the input rod 12 is provided at the first master chamber 20a, and a second piston 22a is provided at the second master chamber 20b. Further, the first master chamber 20a communicates with a first hydraulic pressure port 24a to allow oil to flow in and out, and the second master chamber 20b communicates with a second hydraulic pressure port 24b to allow the oil to flow in and out. For example, the first hydraulic pressure port 24a may be connected to a first backup flow path 251, and the second hydraulic pressure port 24b may be connected to a second backup flow path 252.

Meanwhile, the master cylinder 20 may include the two master chambers 20a and 20b to secure safety when one chamber fails. For example, the first master chamber 20a of the two master chambers 20a and 20b may be connected to a front right wheel FR and a rear left wheel RL of a vehicle through the first backup flow path 251, and the second master chamber 20b thereof may be connected to a front left wheel FL and a rear right wheel RR through the second backup flow path 252. As described above, the two master chambers 20a and 20b may be independently configured so that braking of a vehicle may be possible even when one of the two master chambers 20a and 20b fails.

Also, unlike shown in the drawing, one of the two master chambers 20a and 20b may be connected to the two front wheels FR and FL and the remaining master chamber thereof may be connected to the two rear wheels RR and RL, and the two master chambers 20a and 20b may be connected to each of four wheel cylinders.

Also, a first spring 21b may be provided between the first piston 21a and the second piston 22a of the master cylinder 20, and a second spring 22b may be provided between the second piston 22a and an end portion of the master cylinder 20. That is, the first piston 21a may be accommodated in the first master chamber 20a, and the second piston 22a may be accommodated in the second master chamber 20b.

The first spring 21b and the second spring 22b are compressed by the first piston 21a and the second piston 22a which are moved according to a varied stroke of the brake pedal 10, thereby storing an elastic force. Further, when a force pushing the first piston 21a is less than the elastic force, the first spring 21b and the second spring 22b may use the stored elastic force to push the first and second pistons 21a and 22a and return the first and second pistons 21a and 22a to their original positions.

The input rod 12 configured to pressurize the first piston 21a of the master cylinder 20 may come into close contact with the first piston 21a. There may be no gap between the master cylinder 20 and the input rod 12. Consequently, when the brake pedal 10 is stepped on, the master cylinder 20 may be directly pressurized without a pedal dead stroke section.

The reservoir 30 may include three reservoir chambers 31, 32, and 33. For example, the three reservoir chambers 31, 32, and 33 may be disposed in a row.

The three adjacently disposed reservoir chambers 31, 32, and 33 may be separated by partition walls. For example, the first reservoir chamber 31 and the second reservoir chamber 33 may be separated by a first partition wall, and the second reservoir chamber 33 and the third reservoir chamber 32 may be separated by a second partition wall.

Further, portions of the first partition wall and the second partition wall are open such that the first to third reservoir chambers 31, 32, and 33 may communicate with each other. Therefore, the first to third reservoir chambers 31, 32, and 33 may have the same pressure. For example, the first to third reservoir chambers 31, 32, and 33 may have atmospheric pressure.

Further, the first master chamber 20a may be connected to the first reservoir chamber 31 through a first reservoir flow path 61, and the second master chamber 20b may be connected to the second reservoir chamber 32 through a second reservoir flow path 62.

Furthermore, the master cylinder 20 may include two sealing members which are disposed ahead and behind of the first reservoir flow path 61, and two sealing members which are disposed ahead and behind of the second reservoir flow path 62. The sealing members may each have a ring shape that protrudes from an inner wall of the master cylinder 20 or an outer circumferential surface of each of the first and second pistons 21a and 22a.

Further, a check valve 67 may be provided at the first reservoir flow path 61 to allow oil to flow from the reservoir 30 to the first master chamber 20a and block oil from flowing from the first master chamber 20a to the reservoir 30. The check valve 67 may be provided to allow fluid to flow in only one direction.

Further, a front side and a rear side of the check valve 67 provided at the first reservoir flow path 61 may be connected to each other through a bypass flow path 66. Furthermore, an inspection valve 60 may be provided at the bypass flow path 66.

The inspection valve 60 may be provided with an electronically controlled bidirectional valve configured to control an oil flow between the reservoir 30 and the master cylinder 20. Further, the inspection valve 60 may be configured with a normally open type solenoid valve that is usually open and is closed when a closing signal is received from the first ECU 90.

The pedal simulator 50 may be connected to the first backup flow path 251, which will be described below, to provide a reaction force according to pedal effort of the brake pedal 10. A reaction force may be provided to compensate for a pedal effort provided from a driver such that a braking force may be finely controlled as intended by the driver.

Referring to FIG. 1, the pedal simulator 50 includes a simulation chamber 51 provided to store oil flowing from the first hydraulic pressure port 24a of the master cylinder 20, a reaction force piston 52 provided inside the simulation chamber 51, a pedal simulator provided with a reaction force spring 53 which is configured to elastically support the reaction force piston 52, and a simulator valve 54 connected to a front end portion of the simulation chamber 51.

The reaction force piston 52 and the reaction force spring 53 are installed to have a predetermined range of displacement within the simulation chamber 51 due to oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. For example, the reaction force spring 53 includes a variety of members which are configured with a material including rubber and the like or have a coil or plate shape, thereby being able to store an elastic force.

The simulator valve 54 may be provided at a flow path connecting the first backup flow path 251 and the simulation chamber 51. Further, a front end of the simulation chamber 51 may be connected to the master cylinder 20 through the simulator valve 54 and the first backup flow path 251, and a rear end of the simulation chamber 51 may be connected to the reservoir 30.

Meanwhile, the simulator valve 54 may be configured with a normally closed type solenoid valve that is usually maintained in a closed state. When the driver applies a pedal effort to the brake pedal 10, the simulator valve 54 may be opened to deliver oil in the first master chamber 20a to the simulation chamber 51.

A simulator check valve 55 may be installed to be connected in parallel with the simulator valve 54 between the first master chamber 20a and the pedal simulator 50. The simulator check valve 55 may allow oil in the simulation chamber 51 to flow toward the first master chamber 20a and may block the oil in the first master chamber 20a from flowing toward the simulation chamber 51 through a flow path at which the simulator check valve 55 is installed. Consequently, when the pedal effort of the brake pedal 10 is released, the oil may be discharged from the simulation chamber 51 through the simulator check valve 55 to ensure a rapid return of pressure of the pedal simulator 50.

To describe an operation of the pedal simulator 50, when the driver applies a pedal effort to the brake pedal 10, the oil flowing in through the opened simulator valve 54 pressurizes the reaction force piston 52 of the pedal simulator 50, and the oil in the simulation chamber 51, which is pushed out while the reaction force piston 52 pressurizes the reaction force spring 53, is delivered to the reservoir 30. During such a process, the driver receives a pedal feel.

On the contrary, when the driver releases the pedal effort from the brake pedal 10, the reaction force piston 52 from which the hydraulic pressure is released returns to its original position by the elastic force of the reaction force spring 53, and thus oil in the reservoir 30 flows into the simulation chamber 51 such that the oil may be filled inside the simulation chamber 51. Meanwhile, the oil filled in a front end portion of the reaction force piston 52 in the simulation chamber 51 returns to the master cylinder 20 through a flow path at which the simulator valve 54 is installed and a flow path at which the simulator check valve 55 is installed.

As described above, in the braking state and the braking release state, since the interior of the simulation chamber 51 is in a state in which the oil is always filled therein, friction of the reaction force piston 52 is minimized when the pedal simulator 50 operates, and thus durability of the pedal simulator 50 may be improved and further introduction of foreign materials from the outside may be blocked.

The first hydraulic pressure supply device 70 provides the hydraulic pressure delivered to the wheel cylinder 40. The first hydraulic pressure supply device 70 may be provided in various ways. For example, a piston (not shown) operated by a driving force of a motor (not shown) may push out oil in a chamber, thereby delivering a hydraulic pressure to the wheel cylinder 40. Alternatively, the first hydraulic pressure supply device 70 may be provided with a pump operated by the motor or a high pressure accumulator.

More specifically, when the driver pressurizes the brake pedal 10, an electrical signal is transmitted from the pedal displacement sensor 11 according to a variation in displacement of the brake pedal 10, and the motor operates in response to the electrical signal. Further, a power converter may be provided between the motor and the piston to convert a rotational movement of the motor into a rectilinear movement. The power converter may include a worm, a worm gear, a rack and pinion gear, and/or a ball screw mechanism.

The hydraulic actuator 80 may be configured with the first hydraulic pressure circuit 81 and the second hydraulic pressure circuit 82, each of which receives a hydraulic pressure and controls two wheels. For example, the first hydraulic pressure circuit 81 may control the front right wheel FR and the rear left wheel RL, and the second hydraulic pressure circuit 82 may control the front left wheel FL and the rear right wheel RR. Further, the wheel cylinder 40 is installed at each of the wheels FR, FL, RR, and RL to perform braking by receiving the hydraulic pressure.

A first cut valve 261 configured to control a hydraulic pressure flow is provided at the first backup flow path 251 connecting the first hydraulic pressure port 24a and the first hydraulic pressure circuit 81, and a second cut valve 262 configured to control a hydraulic pressure flow is provided at the second backup flow path 252 connecting the second hydraulic pressure port 24b and the second hydraulic pressure circuit 82.

The hydraulic actuator 80 may include an inlet valve (not shown) provided at a front end of each of the wheel cylinders 40 and configured to control the hydraulic pressure, and an outlet valve (not shown) branching off between the inlet valve and each of the wheel cylinders 40 and connected to the reservoir 30.

The reservoir 30 may be connected to the first hydraulic pressure supply device 70. Further, the reservoir 30 may be separately provided at an oil line (not shown) connected from the first hydraulic pressure supply device 70 to the reservoir 30 and at a dump line (not shown) connected from the wheel cylinder 40 to the reservoir 30. Therefore, bubbles which may occur in the dump line during braking performed by the ABS can be prevented from flowing into a chamber of the first hydraulic pressure supply device 70 such that performance deterioration of the ABS can be prevented.

Meanwhile, an undescribed reference numeral "PS1" is a hydraulic flow path pressure sensor configured to sense a hydraulic pressure of each of the first and second hydraulic pressure circuits 81 and 82, and an undescribed reference numeral "PS2" is a backup flow path pressure sensor configured to measure an oil pressure of the master cylinder 20.

The second hydraulic pressure supply device 100 is provided between the reservoir 30 and the master cylinder 20 to provide a vibration pedal feel to the brake pedal 10.

The second hydraulic pressure supply device 100 may include pump units 110 and 120 provided at the second reservoir flow path 62 between the reservoir 30 and the master cylinder 20, an electronically controlled bidirectional valve 130 provided at a first bypass flow path 64 disposed in parallel with the second reservoir flow path 62, a check valve 140 provided at a second bypass flow path 65 disposed in parallel with the first bypass flow path 64, and a second ECU (not shown) configured to control the pump units 110 and 120 and the electronically controlled bidirectional valve 130.

The pump units 110 and 120 may include a motor 120 operated by a command of the second ECU (not shown) and a pump 110 operated by a driving force of the motor 120 and configured to boost hydraulic pressure. The pump units 110 and 120 may be provided in a structure in which a pump piston is moved forward and backward through a rotation of an eccentric shaft of the motor 120. When the pump units 110 and 120 are operated, pulsation is generated in the hydraulic pressure which is being discharged.

First and second check valves 111 and 112 may be provided at the second reservoir flow path 62 disposed at front and rear ends of the pump 110. The first and second check valves 111 and 112 are provided to deliver oil in only a direction from the reservoir 30 to the master cylinder 20 and block delivery of the oil in an opposite direction. Alternatively, unlike shown in the drawing, a check valve may be provided only at either the front end or rear end of the pump 110.

The electronically controlled bidirectional valve 130 may be configured with a solenoid valve configured to control a bidirectional oil flow between the reservoir 30 and the master cylinder 20. Specifically, the electronically controlled bidirectional valve 130 may be configured with a normally open type solenoid valve that is usually open and is closed when a closing signal is received from an ECU.

The check valve 140 may be provided to deliver the oil in only the direction from the reservoir 30 to the master cylinder 20 and block delivery of the oil in the opposite direction.

The second ECU may be provided integrally with or separately from the first ECU 90. When the second ECU is separately provided from the first ECU 90, it is advantageous for the second ECU to be able to issue a command to the second hydraulic pressure supply device 100 even when the first hydraulic pressure supply device 70 operates abnormally due to a failure of the first ECU 90. That is, even when the first hydraulic pressure supply device 70 does not operate normally, the hydraulic pressure may be supplied to the wheel cylinder 40 using the second hydraulic pressure supply device 100.

The control of transferring a vibration pedal feel to the brake pedal 10 by operating the second hydraulic pressure supply device 100 according to one embodiment will be described below.

When the driver applies a pedal effort to the brake pedal 10 to perform a braking operation, the first ECU 90 blocks the first and second cut valves 261 and 262 provided at the first and second backup flow paths 251 and 252, opens the simulator valve 54, and operates the first hydraulic pressure supply device 70 using a signal of the pedal displacement sensor 11.

Through such operations, the oil in the first master chamber 20a pressurizes the reaction force piston 52 of the pedal simulator 50 and the reaction force piston 52 compresses to push the reaction force spring 53 such that, as denoted by A in FIG. 3, a pedal feel of a constant force may be provided to the driver.

Further, the oil supplied from the first hydraulic pressure supply device 70 is delivered to the wheel cylinder 40 through valves (not shown) of the hydraulic actuator 80 such that the braking operation is performed.

At this point, when a safety braking function is performed by the ABS or the like, the second ECU drives the motor 120 to direct the oil in the reservoir 30 to the second master chamber 20b of the master cylinder 20 through the second reservoir flow path 62. Since the second cut valve 262 provided at the second backup flow path 252 has been closed, the oil directed to the second master chamber 20b transfers pressure pulsation to the second piston 22a and is directed to an inlet side of the pump 110 through the first bypass flow path 64.

Through such operations, the oil discharged through the pump 110 circulates through the second reservoir flow path 62 and the first bypass flow path 64, periodical hydraulic pressure pulsation generated due to a discharge stroke of the pump 110 in the form of an eccentric piston pump is delivered to the second master chamber 20b of the master cylinder 20, and the periodical hydraulic pressure pulsation, which was delivered to the second master chamber 20b, is delivered to the brake pedal 10 via the second piston 22a and the first piston 21a, such that a vibration pedal feel is provided to the driver as denoted by B in FIG. 3. Therefore, the driver can recognize activation of the safety braking function through the vibration pedal feel while the braking operation is performed.

Alternatively, the pump units 110 and 120 may be driven to correspond to an intermittent flow of the oil flowing into the wheel cylinder 40 by synchronizing the motor 120 with the valves of the hydraulic actuator 80.

Meanwhile, the electronically controlled bidirectional valve 130 may also be used as an inspection valve in an inspection mode. The inspection mode is a mode in which it is inspected whether there is a loss of pressure by generating a hydraulic pressure in the first hydraulic pressure supply device 70 to inspect whether a leak occurs at the simulator valve 54. When the hydraulic pressure discharged from the first hydraulic pressure supply device 70 is delivered to the reservoir 30 to cause a pressure loss, it is difficult to identify whether a leak occurs at the simulator valve 54.

Therefore, in the inspection mode, the electronically controlled bidirectional valve 130 may be blocked and thus a hydraulic pressure circuit connected to the first hydraulic pressure supply device 70 may be configured as a closed circuit. That is, the electronically controlled bidirectional valve 130, the simulator valve 54, and the outlet valve (not shown) are blocked and thus the flow paths connecting the first hydraulic pressure supply device 70 to the reservoir 30 are blocked such that the closed circuit may be configured.

Alternatively, the second hydraulic pressure supply device 100 may further perform a function of driving the pump units 110 and 120 in an emergency situation in which the first hydraulic pressure supply device 70 fails, blocking the electronically controlled bidirectional valve 130, and operating the wheel cylinder 40 by adding the hydraulic pressure generated in the second hydraulic pressure supply device 100 to the hydraulic pressure of the master cylinder 20. Therefore, a braking pressure required by the driver can be sufficiently provided and the braking pressure can be rapidly generated at a speed required by the driver.

The second hydraulic pressure supply device 100 further includes a pressure sensor 150 installed at a lower end of the pump 110 and configured to measure a hydraulic pressure. The pressure sensor 150 measures the hydraulic pressure discharged from the pump 110 and the first ECU 90 may increase a rotational speed of the motor 120 when a magnitude of the hydraulic pressure measured by the pressure sensor 150 is determined to be small. Specifically, when the driver steps on the brake pedal 10, a target pressure required by the driver may be estimated on the basis of pedal information including a pedal stroke and pedal effort, and feedback control may be performed through the pressure sensor 150.

Figure 4:
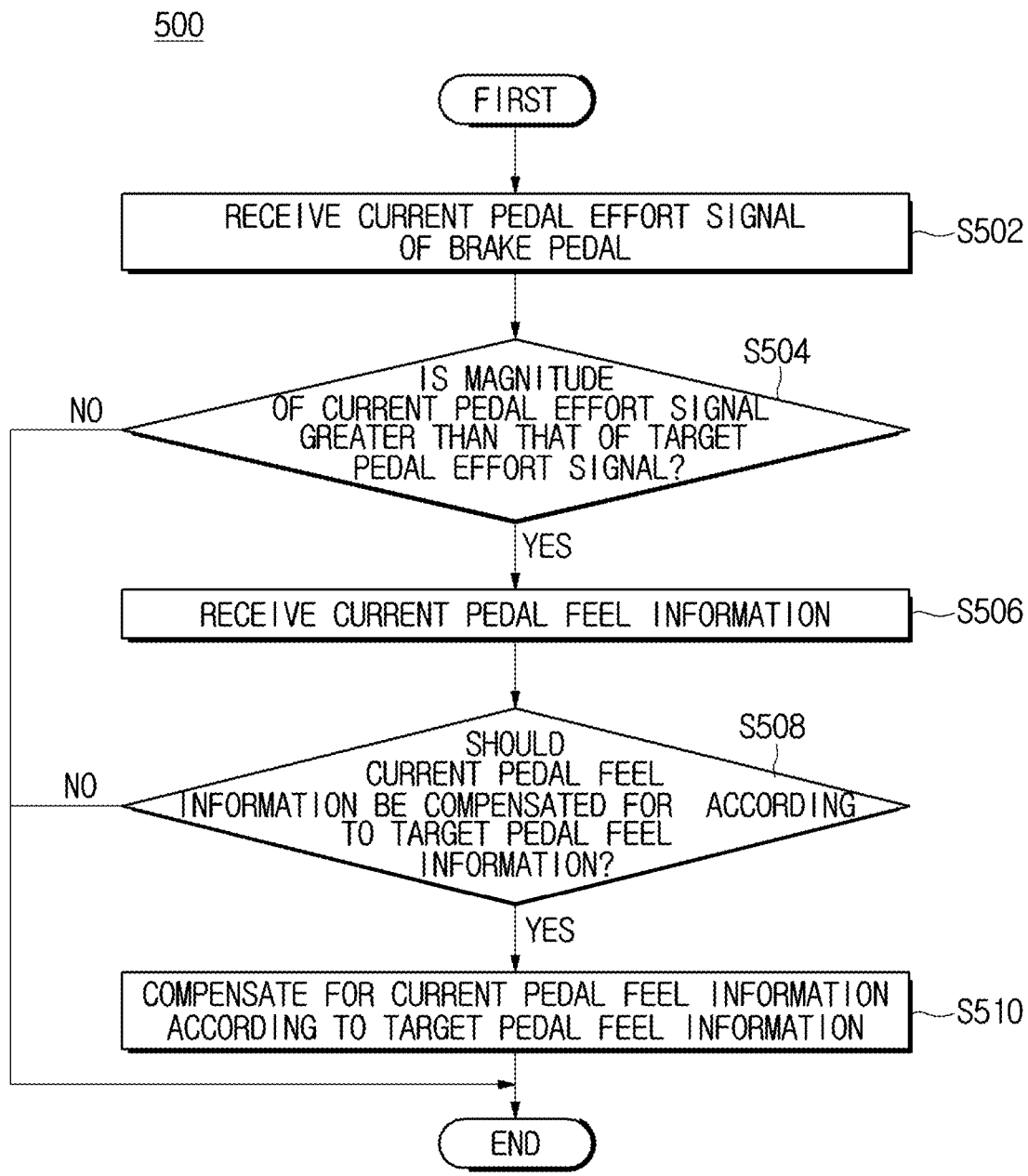
FIG. 4 is a flowchart illustrating a control method of an electronic brake system according to another embodiment of the present disclosure.

FIG. 4 is a flowchart illustrating a control method of an electronic brake system according to another embodiment of the present disclosure.

The first ECU 90 of the electronic brake system according to another embodiment of the present disclosure includes an inputter 102a, a determiner 102b, and a controller 104.

The inputter 102a receives a current pedal effort signal of the brake pedal 10, which is sensed by the pedal displacement sensor 11, and receives current pedal feel information generated by the pedal simulator 50 in response to the received current pedal effort signal.

The determiner 102b determines whether a current state is a first state in which a magnitude of the current pedal effort signal input to the inputter 102a is greater than that of a predetermined target pedal effort signal.

Further, when the current state is determined as being the first state, the determiner 102b determines whether the current state is a second state in which the current pedal feel information should be compensated for according to predetermined target pedal feel information.

When determining whether the current state is the second state, in a pedal feel determination section for a predetermined period of time, the determiner 102b may determine that a current reaction force value should be compensated for according to a target reaction force value when the current reaction force value required for the generation of a current pedal feel of the current pedal feel information is determined as not reaching the target reaction force value required for the generation of a target pedal feel of the predetermined target pedal feel information.

When the current state is determined as being the first state and the second state in the determiner 102b, the controller 104 controls the pedal simulator 50 so that the pedal simulator 50 compensates for the current pedal feel information according to the target pedal feel information.

The target pedal feel information may include a vibration pattern so as to provide a pedal feel having a vibration feel when at least one among an ABS, a BTCS, and an ESC system performs braking.

That is, the target reaction force value may include the vibration pattern so as to provide the pedal feel having the vibration feel.

The inputter 102a, the determiner 102b, and the controller 104 may be provided in the first ECU 90.

Alternatively, the inputter 102a, the determiner 102b, and the controller 104 may be provided in a micro control unit (MCU) (not shown) having a processor, a memory, and an input/output device in a single chip and configured to control overall operations of a vehicle, an input of pedal feel information, determination thereof, and compensation therefor.

Alternatively, the inputter 102a, the determiner 102b, and the controller 104 are not limited to that described above, and may be any input means, any determination means, and any control means which is capable of controlling overall operations of a vehicle, an input of pedal feel information, determination thereof, and compensation therefor.

For example, when a driver steps on the brake pedal 10, the pedal displacement sensor 11 may sense and determine whether a current state is a first state in which a magnitude of a current pedal effort signal is greater than that of a predetermined target pedal effort signal.

Here, when the current state is determined as being the first state, the pedal simulator 50 may receive the current pedal effort signal of the brake pedal 10 by an operation of the master cylinder 20 resulting from an operation of the input rod 12.

Thereafter, the pedal simulator 50 may generate the current reaction force value according to the current pedal effort signal to generate the current pedal feel information.

The determiner 102b may determine whether the current state is a second state in which the current pedal feel information should be compensated for according to the predetermined target pedal feel information.

When the determiner 102b determines, in a pedal feel determination section for a predetermined period of time, that the current reaction force value required for the generation of a current pedal feel of the current pedal feel information does not reach the target reaction force value required for the generation of a target pedal feel of the predetermined target pedal feel information on the basis of an input value input by the pressure sensor 150, the determiner 102b may determine the current state as being the second state in which the current reaction force value should be compensated for according to the target reaction force value.

When the determiner 102b determines the current state as being the second state, the controller 104 may, via an opening operation of the electronically controlled bidirectional valve 130, a driving operation of the motor 120, and a pumping operation of the pump 110, compensate for the current reaction force value required for the generation of the current pedal feel of the current pedal feel information according to the target reaction force value required for the generation of the target pedal feel of the predetermined target pedal feel information.

Further, the controller 104 may provide the current reaction force value, which is compensated for through the opening operation of the electronically controlled bidirectional valve 130, the driving operation of the motor 120, and the pumping operation of the pump 110, to the pedal simulator 50, thereby controlling the pedal simulator 50 to provide the target pedal feel of the target pedal feel information at the brake pedal 10.

A control method 500 of the electronic brake system according to another embodiment of the present disclosure includes a first input operation 502, a first determination operation 504, a second input operation 506, a second determination operation 508, and a pedal feel adjustment operation 510.

First, in the first input operation 502, the inputter 102a receives a current pedal effort signal of the brake pedal 10, which is sensed by the pedal displacement sensor 11.

Then, in the first determination operation 504, the determiner 102b determines whether a current state is a first state in which a magnitude of the current pedal effort signal input to the inputter 102a is greater than that of a target pedal effort signal predetermined in the determiner 102b.

Thereafter, when the determiner 102b determines the current state as being the first state, in the second input operation 506, the inputter 102a receives current pedal feel information, which is generated in the pedal simulator 50, according to the received current pedal effort signal.

Subsequently, in the second determination operation 508, the determiner 102b determines whether the current state is a second state in which the current pedal feel information should be compensated for according to target pedal feel information.

Here, when the determiner 102b determines whether the current state is the second state, in the second determination operation 508, the determiner 102b determines that the current reaction force value required for the generation of a current pedal feel of the current pedal feel information does not reach the target reaction force value required for the generation of a target pedal feel of the target pedal feel information predetermined in the determiner 102b.

When the determiner 102b determines the current state as being the second state, in the pedal feel adjustment operation 510, the controller 104 controls the pedal simulator 50 so that the pedal simulator 50 compensates for the current pedal feel information according to the target pedal feel information.

The target pedal feel information may include a vibration pattern B of FIG. 3 so as to provide a pedal feel having a vibration feel when at least one among the ABS, the BTCS, and the ESC system performs braking.

That is, the target reaction force value may include the vibration pattern B of FIG. 3 to provide the pedal feel having the vibration feel.

Figure 5:
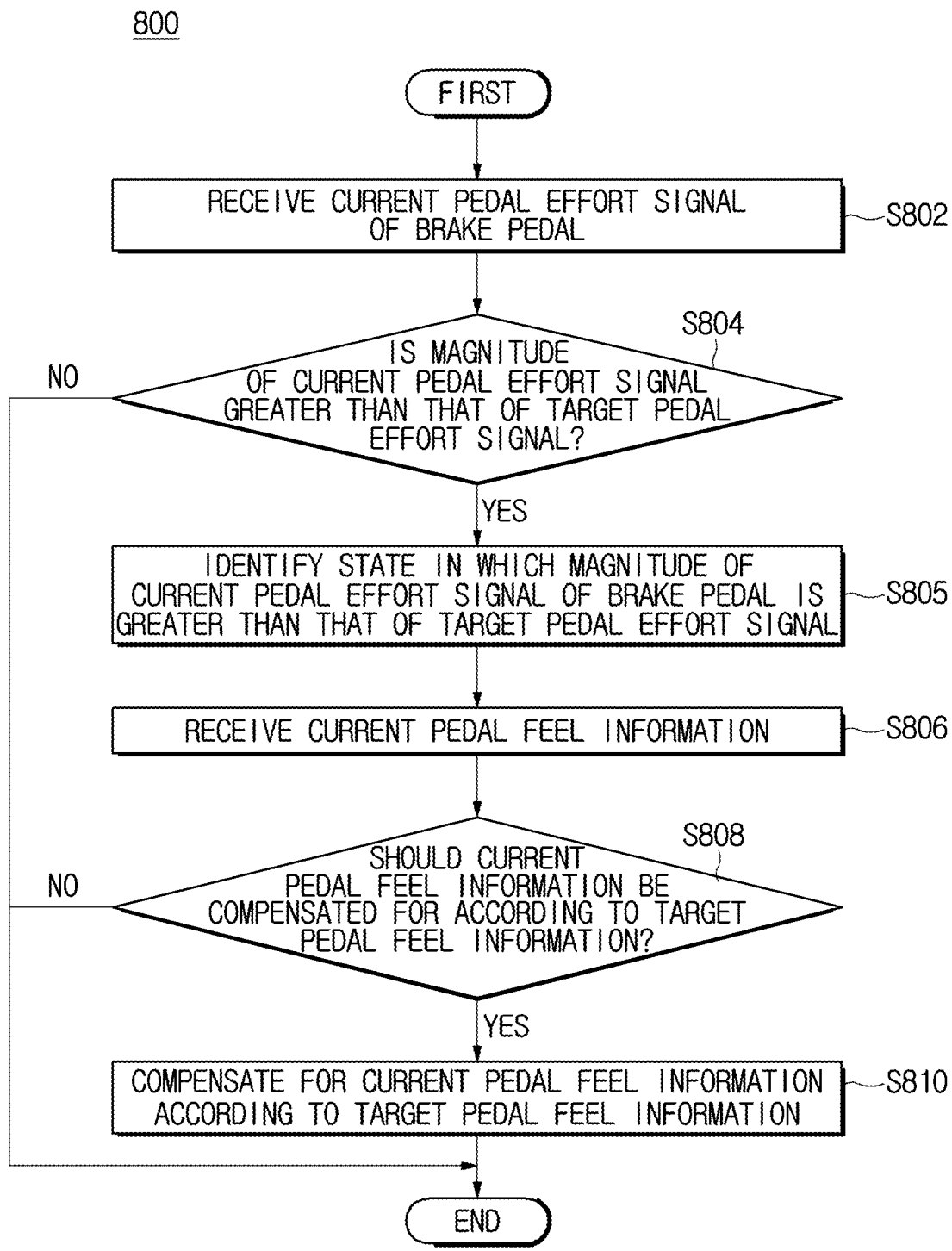
FIG. 5 is a flowchart illustrating a control method of an electronic brake system according to still another embodiment of the present disclosure.

FIGS. 5 and 6 are flowcharts illustrating a control method of an electronic brake system according to still another embodiment of the present disclosure. Like the control method 500 of FIG. 4 of the electronic brake system according to another embodiment, control methods 800 and 900 of the electronic brake system according to still another embodiment include first input operations 802 and 902, first determination operations 804 and 904, second input operations 806 and 906, second determination operations 808 and 908, and pedal feel adjustment operations 810 and 910.

Functions of the operations of the control methods 800 and 900 of the electronic brake system according to still another embodiment of the present disclosure and a systematic connection relationship between the operations thereof are the same as the functions of the operations of the control method 500 of FIG. 4 of the electronic brake system according to another embodiment and the systematic connection relationship between the operations thereof, so additional descriptions thereof will be omitted below.

Here, the control method 800 of the electronic brake system according to the embodiment of FIG. 5 further includes a first identification operation 805, and the control method 900 of the electronic brake system according to the embodiment of FIG. 6 further includes a second identification operation 909.

That is, when the determiner 102b determines the current state as being the first state, in the first identification operation 805, a state in which the magnitude of the current pedal effort signal of the brake pedal 10 is greater than that of the target pedal effort signal may be identified under the control of the controller 104.

Further, when the determiner 102b determines the current state as being the second state, in the second identification operation 909, the current pedal feel information may be identified under the control of the controller 104.

For example, when the determiner 102b determines the current state as being the second state, in the second identification operation 909, a state in which the current reaction force value required for the generation of the current pedal feel of the current pedal feel information or the current pedal feel information, which will be compensated for, is being compensated for according to the target pedal feel information may be identified.

As is apparent from the above description, the electronic brake system and the control method thereof according to the embodiments of the present disclosure can realize current pedal feel of a brake pedal when a driver steps on the brake pedal, thereby improving reliability of a vehicle.

Further, the electronic brake system and the control method thereof according to the embodiments of the present disclosure can relieve anxiety the driver experiences during braking.

Furthermore, the electronic brake system according to the embodiments of the present disclosure can provide a vibration to the brake pedal in a brake-by-wire mode even when at least one among the ABS, the BTCS, and the ESC system performs braking, thereby simulating an actual pedal feel.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
   a master cylinder connected to a reservoir storing oil, the master cylinder including a master chamber and a master piston provided at the master chamber, and configured to discharge the oil according to pedal effort of a brake pedal;
   a sensor configured to measure a displacement of the brake pedal;
   a pedal simulator configured to provide a reaction force according to pedal effort of the brake pedal and including a simulator chamber connected to the master cylinder to accommodate the oil;
   a hydraulic actuator provided between the master cylinder and a wheel cylinder and configured to control a hydraulic pressure flow delivered to the wheel cylinder;
   a first hydraulic pressure supply device operated by an electrical signal which is output by corresponding to the displacement of the brake pedal, and configured to supply a hydraulic pressure to the hydraulic actuator; and
   a second hydraulic pressure supply device provided between the reservoir and the master cylinder, wherein a vibration pedal feel is provided to the brake pedal by hydraulic pressure pulsation generated by the second hydraulic pressure supply device provided between the reservoir and the master cylinder,
   wherein the master cylinder has first and second chambers, and
   wherein a first flow path, comprising an inspection valve and a check valve connected in parallel and connected between the first chamber of the master cylinder and the reservoir, and a second flow path, comprising the second hydraulic pressure supply device connected between the second chamber of the master cylinder and the reservoir, are separated from each other.

2. The system of claim 1, wherein:
   the master cylinder includes a first master piston directly pressurized by the brake pedal, a first master chamber configured to accommodate the first master piston, a second master piston indirectly pressurized by the first master piston, and a second master chamber configured to accommodate the second master piston, and
   the second hydraulic pressure supply device is provided at the second flow path connecting the second master chamber and the reservoir.

3. The system of claim 2, wherein, when the second hydraulic pressure supply device operates, the hydraulic pressure pulsation is delivered to the second master chamber to provide a vibration pedal feel to the brake pedal.

4. The system of claim 1, wherein the second hydraulic pressure supply device operates when at least one among an anti-lock brake system (ABS), a brake traction control system (BTCS), and an electronic stability control (ESC) system performs braking.

5. The system of claim 1, wherein the second hydraulic pressure supply device includes a pump unit provided at a reservoir flow path between the reservoir and the master cylinder and an electronically controlled bidirectional valve provided at a first bypass flow path disposed in parallel with the reservoir flow path.

6. The system of claim 5, wherein the second hydraulic pressure supply device further includes a check valve provided at a second bypass flow path disposed in parallel with the first bypass flow path.

7. The system of claim 6, wherein the check valve is a one-way valve configured to allow a flow from the reservoir to the master cylinder.

8. The system of claim 5, wherein the pump unit is a piston pump which moves forward and backward by an eccentric rotational shaft.

9. The system of claim 5, wherein the electronically controlled bidirectional valve is opened when the pump unit is operated.

10. The system of claim 1, wherein the sensor is provided in at least one of the brake pedal and the master cylinder.

11. A control method of the system according to claim 1, the method comprising:
    directing a hydraulic pressure of the master cylinder to the pedal simulator when a driver pressurizes the brake pedal, and generating a pedal feel;
    operating the first hydraulic pressure supply device and supplying the hydraulic pressure to the hydraulic actuator in response to an electrical signal which is output by corresponding to a displacement of the brake pedal;
    determining whether a vibration pedal effort is required at the brake pedal; and
    operating the second hydraulic pressure supply device when the vibration pedal effort is required at the brake pedal.

12. The control method of claim 11, wherein the vibration pedal effort is required at the brake pedal when at least one of an anti-lock brake system (ABS), a brake traction control system (BTCS), and an electronic stability control (ESC) system performs braking.

13. The control method of claim 11, wherein:
    the second hydraulic pressure supply device includes a pump unit provided at a reservoir flow path between the reservoir and the master cylinder and an electronically controlled bidirectional valve provided at a first bypass flow path disposed in parallel with the reservoir flow path, and
    the second hydraulic pressure supply device operates to drive the pump unit and open the electronically controlled bidirectional valve.

14. The system of claim 1, wherein the second hydraulic pressure supply comprises:
    a pump; and
    one or more check valves connected between the reservoir and the pump and/or between the master cylinder and the pump to block oil flow in a direction from the master cylinder to the reservoir.

* * * * *